US007489751B2

(12) United States Patent
Ruprich et al.

(10) Patent No.: US 7,489,751 B2
(45) Date of Patent: Feb. 10, 2009

(54) METHOD AND APPARATUS FOR SYNCHRONIZATION OF A RECEIVER TO A TRANSMITTER

(75) Inventors: Thomas Ruprich, München (DE);
Steffen Paul, Baierbrunn (DE);
Burkhard Becker, Ismaning (DE);
Thuyen Le, Schönaich (DE)

(73) Assignee: Infineon Technologies AG, Munich (DE)

( * ) Notice: Subject to any disclaimer, the term of this patent is extended or adjusted under 35 U.S.C. 154(b) by 472 days.

(21) Appl. No.: 11/076,141

(22) Filed: Mar. 9, 2005

(65) Prior Publication Data
US 2005/0201502 A1 Sep. 15, 2005

Related U.S. Application Data

(63) Continuation of application No. PCT/DE03/02680, filed on Aug. 8, 2003.

(30) Foreign Application Priority Data
Sep. 9, 2002 (DE) ............... 102 41 690

(51) Int. Cl.
*H04L 7/00* (2006.01)
*H04J 3/06* (2006.01)

(52) U.S. Cl. .................. 375/354; 375/343; 370/350

(58) Field of Classification Search ................ 375/354, 375/150, 343, 365, 368; 370/350, 503, 509, 370/514
See application file for complete search history.

(56) References Cited

U.S. PATENT DOCUMENTS 5,724,384 A * 3/1998 Kim et al. ............. 375/149

| | | | | |
|---|---|---|---|---|
| 5,883,929 A | * | 3/1999 | Wang et al. | 375/367 |
| 2005/0207393 A1 | * | 9/2005 | Becker et al. | 370/350 |

FOREIGN PATENT DOCUMENTS

| DE | 197 11 057 A1 | | 11/1997 |
|---|---|---|---|
| DE | 199 61 557 A1 | | 7/2001 |
| EP | 0 654 913 A2 | | 5/1995 |
| EP | 0 804 002 A1 | | 10/1997 |
| EP | 804002 A1 | * | 10/1997 |
| EP | 0 852 430 A2 | | 7/1998 |
| EP | 1 035 665 A1 | | 9/2000 |
| EP | 1035665 A1 | * | 9/2000 |
| WO | WO 00/44117 A2 | | 7/2000 |
| WO | WO 01/01596 A1 | | 1/2001 |

OTHER PUBLICATIONS

A Multi-purpose Threshold Detector for Mobile Radio Application, IEEE Jun. 1994, R. Oliver, E. Le Strat, C. Mourot Alcatel pp. 1268-1271.*
Direct Sequence Spread Spectrum Matched Filter Acquisition in Frequency-Selective Rayleigh Fading Channels, Brima B. Ibrahim and A. Hamid Aghvami, IEEE 1994 pp. 885-890.*
Digital Communications, Third Edition, 1995, Chapter 2: Probability and Stochastic Processes, pp. 43, 45.*

(Continued)

*Primary Examiner*—Betsy L Deppe
(74) *Attorney, Agent, or Firm*—Eschweiler & Associates, LLC (57) ABSTRACT

In a method for synchronization of a receiver to a transmitter which periodically transmits a sequence which is known in the receiver, a subset of possible synchronization times is determined in a first selection process by repeated correlation of the received signal with the known sequence and comparison of the correlation responses, as calculated for the correlations, with a threshold value. The threshold value is in this case varied adaptively as a function of at least one parameter which is measured during the correlations.

23 Claims, 4 Drawing Sheets

OTHER PUBLICATIONS

"A Multi-Purpose Threshold Detector for Mobile Radio Application", R. Olivier, E. Le Strat and C. Mourot, Vehicular Technology Conference, 1994, IEEE 44th Stockholm, Sweden, Jun. 8-10, 1994, New York, N.Y. ,, Jun. 8, 1994, pp. 1268-1271.

"Spread-Spectrum Signal Acquisition: Methods and Technology", Stephen S. Rappaport and Donald M. Grieco, IEEE Communications Magazine, IEEE Service Center, Piscataway, N.J., vol. 22, No. 6, Jun. 1, 1984, pp. 6-21.

3GPP TS 25.211. V4.4.0 (Mar. 2002), 3rd Generation Partnership Project; Technical Specification Group Radio Access Network; Physical Cannels and Mapping of Transport Channels onto Physical Channels (FDD) (Release 4), 46 pgs.

International Search Report, Int'l Application No. PCT/DE03/02680, Int'l Filing Date Aug. 8, 2003, 3 pgs.

U.S. Appl. No. 11/076,210, filed Mar. 9, 2005, Becker et al.

"Direct Sequence Spread Spectrum Matched Filter Acquisition in Frequency-Selective Reyleight Fading Channels", Brima B. Ibrahim and Humid Aghvami, IEEE Journal of Selected Areas in Communications, vol. 12, No. 5, Jun. 1994, 5 pgs.

Chapter 2 "Probability and Stochastic Processes", *Digital Communications 3rd Edition*, J. G. Proakis, 1995, pp. 43 and 45.

International Search Report, Int'l. Application No. PCT/DE03/02679, Int'l. Filing Date Aug. 8, 2003.

\* cited by examiner

METHOD AND APPARATUS FOR SYNCHRONIZATION OF A RECEIVER TO A TRANSMITTER

REFERENCE TO RELATED APPLICATIONS

This application is a continuation of PCT/DE03/02680, filed Aug. 8, 2003 which was not published in English, which claims the benefit of the priority date of German Patent Application No. DE 102 41 690.7, filed on Sep. 9, 2002, the contents of which both are herein incorporated by reference in their entireties.

FIELD OF THE INVENTION

The invention relates to a method and an apparatus for synchronization of a receiver to a transmitter, with the transmitter periodically transmitting a sequence which is known in the receiver.

BACKGROUND OF THE INVENTION

In many areas of communications technology and in particular in mobile radio systems, a receiver must be synchronized to a transmitter before a connection is set up. For this purpose, the transmitter generally periodically transmits a specific sequence, which is known in the receiver and is also referred to as a sync word. This sequence is searched for in the incoming data stream in the receiver. When the sequence is found in the incoming data stream, the sought synchronization time is obtained from the timing of the detected sequence.

The data stream is typically subdivided in the transmitter into so-called slots (time slots) with a fixed number of bits (which are also referred to as chips when the spreading code method is used). The sync word which must be identified by means of a suitable method in the receiver is located at the start of a slot such as this. The expression slot synchronization is used in this case.

Figure 1:
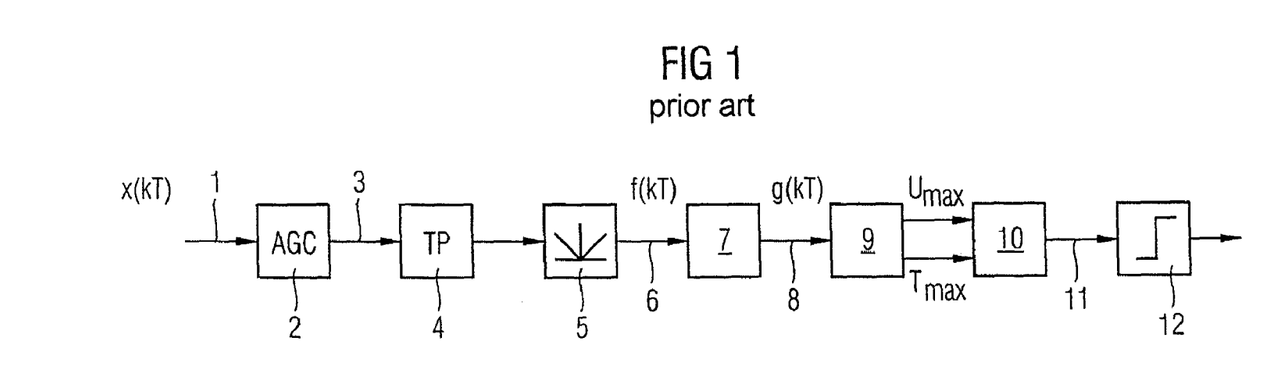
FIG. 1 is a prior art circuit diagram illustrating a system for synchronizing a receiver to a transmitter.

FIG. 1 shows a known procedure for determination of the slot start by means of a matched filter (search filter). The sampling time period is annotated T, while k denotes the time index (that is to say the discrete time). The sample values of the in-phase and quadrature components of the baseband signal x(kT) are supplied as an input signal 1 to an amplitude control means AGC (Automatic Gain Control) 2. The signal 3 emitted from the AGC 2 is passed to a low-pass filter TP 4. A signal 6 with a real amplitude is produced by magnitude formation (addition of the squares of the signal components) in a unit 5. This signal 6 is filtered by a matched filter 7. The impulse response of this filter 7 corresponds to the complex-conjugate sync word reflected in the time domain. The matched filter 7 produces a result g(kT) for each sample value x(kT). The maximum value occurs, in a similar way to that in the case of a correlator, at the filter output when the slot start has been found (minus the latency of the filter 7). The filtered signal g(kT) for all the sampling time kT, for example k= 1, ..., 2560, ..., 5120, provided that 5120 samples are taken within one slot, is thus referred to as the correlation response 8.

A search for the maximum is carried out in a unit 9 within an observation interval, which corresponds to the slot duration, in order to detect correlation peaks in the correlation response 8. The maximum $U_{max}$ and the associated time $T_{max}$ are passed to an evaluation unit 10. The evaluation unit 10 compares the detected maximum $U_{max}$ with a specific, previously defined threshold value. The evaluation result 11 is signalled to a decision maker 12. If the threshold value has been exceeded, the decision maker 12 decides that a sync word has been detected at the time $T_{max}$.

Since the mobile radio channel is not a static channel, it is not sufficient to carry out the method described above for only a single slot. A number of slots typically have to be processed in order to make an error-free decision on the slot boundaries. In consequence, intermediate results of the correlation responses 8 must be stored over a number of slot intervals and must be accumulated in the evaluation unit 10 before comparison with the threshold value. The threshold value level determines the yield and confidence of the method. The higher the preset threshold value in the evaluation unit 10 the fewer sync words are detected but, furthermore, the lower is the probability of an incorrect decision based on a sync word being simulated by interference.

The slot length in the UMTS (Universal Mobile Telecommunication System) Standard is 2560 chips (an in-phase and quadrature component in each case). An oversampling factor of 2 is normally used. Up to 10240 sample values therefore have to be stored, based on a typical resolution of 8 bits per slot.

A multistage evaluation method may be used in order to reduce the amount of memory. The principle of multistage evaluation is based on the idea of a subset of possible times for the slot start in different (mobile radio) cells being determined first of all during a initial selection process, for each slot. Only the times included in this subset are processed further and are possible candidates for the slot start of one or more cells. The slot start of each cell is then determined in a second selection step, which is more accurate and has a higher resolution than the first selection step.

With regard to the example of the UMTS standard, it is possible, by way of example, to provide for the 5120 correlation values emitted from the matched filter for each slot (for one signal component with double oversampling) to be restricted to a subset of, for example, 1280 correlation values. This initial selection process can be carried out with relatively little effort, but itself reduces the possible synchronization times by a factor of 4. The second selection step requires considerably greater accuracy (since only that time index at which the slot start is located must be determined from the 1280 time indices), but it need be carried out only for the preselected 1280 time indices k.

One difficulty with a multistage method such as this is that the two selection steps (initial selection and final selection) must be matched to one another as accurately as possible. In practice, the maximum size of the subset which can be processed in the second selection step is limited by hardware requirements (memory size, clocking etc). If the number of possible time indices in the initial selection process is greater than this subset, it is not possible to take account of all the preselected time indices in the second selection step. This results in the loss of information which was obtained in the first selection step. If, on the other hand, the number of time indices calculated in the first selection step is considerably less than the size of the subset (for example 1280 correlation values), the capacity of the second selection step is not utilized. Furthermore, during the initial selection process, there is a risk of this preselection process being excessively strict bearing in mind the low accuracy, thus likewise reducing the amount of information available for the second selection step.

It is therefore important for the initial selection process to be carried out so as to just exhaust the capacity of the subsequent second selection step.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to a method for synchronizing a receiver to a transmitter, which ensures that a number of preselected possible synchronization times obtained in a first selection step is matched to a predetermined capacity of a second selection step. A further aim of the invention is to provide an apparatus for synchronizing a receiver to a transmitter, which allows capacity matching between a first and a second selection step.

According to one embodiment of the present invention, a set of possible synchronization times for one or more cells is determined in a first selection step by repeated correlation of the signal received by the receiver with the known sequence and comparison of the correlation responses, as calculated for the correlations, with a threshold value. In a second selection step, the actual synchronization time of one cell or the actual synchronization times of two or more cells is or are determined from the set of possible synchronization times.

In this exemplary embodiment, the threshold value is adaptively varied in the first selection step as a function of at least one parameter which is measured during the correlations. The threshold value is varied in such a way that the set of two or more possible synchronization times determined in the first selection step always comprises virtually the same number of possible synchronization times, with the number being predetermined. This guarantees that the second selection step is always based on an essentially constant number of possible synchronization times, thus resulting in optimum matching between the first and the second selection step.

The first selection step preferably comprises the following: (a1) comparison of the correlation values of a correlation response with the threshold value; (a2) notation of the times at which the correlation values of the correlation response exceed the threshold value; (a3) measurement of the at least one parameter; (a4) setting of the threshold value as a function of the parameter for the next correlation process; (a5) repetition of steps (a1) to (a4) for further correlation responses; and (a6) determination of the set of possible synchronization times as those times at which the adaptive threshold value has been exceeded a predetermined number of times.

It should be mentioned that the set of possible synchronization times, can be fixed by presetting the number of times the threshold value must be exceeded in order to include the appropriate synchronization time in the set. However, this definition is too coarse on its own (that is to say without the threshold value adaptation according to the invention). For example, a situation may occur in which a (fixed) threshold value is exceeded m times for a given number of correlations (Ncor) for a comparatively large number of synchronization times (for example considerably greater than 1280) and where the same threshold value is exceeded m+1 times only for a comparatively small number of possible synchronization times (for example considerably less than 1280). Both criteria (the threshold value being exceeded m times and the threshold value being exceeded m+1 times) are then unsuitable for production of a set of possible synchronization times whose size is about 1280. Effective capacity matching between the first selection step and the second selection step is achieved by the adaptive threshold value adjustment from one correlation process to the next in accordance with the present invention.

The at least one measured parameter which is used for adaptive adjustment of the threshold value is preferably characteristic of the statistics of the correlation response. In this situation, a first advantageous method variant is characterized in that a first parameter is a measure of the standard deviation of the correlation response. A second advantageous method variant is characterized in that a second parameter indicates the number of times at which the correlation values of the correlation response exceed the current threshold value in the individual matched filter runs. Taking account of the statistical properties of a correlation response for the adjustment of the threshold value for the evaluation of the next correlation response ensures effective control of the number of possible synchronization times selected in the first selection step.

One advantageous procedure for adjusting the threshold value from one correlation process to the next is characterized in that the threshold value is increased by a first threshold value offset when the number of times at which the correlation values of the correlation response exceed the threshold value is greater than a first predetermined number. Further, the threshold value is reduced by a second threshold value offset when the number of times at which the correlation values of the correlation response exceed the threshold value is less than a second predetermined number, and in that, for example, the first threshold value offset and/or the second threshold value offset increase as the distribution width and standard deviation of the correlation values of the correlation response rises. This means that the threshold value correction becomes greater as the distribution of the correlation response becomes flatter. In contrast, if the distribution width and standard deviation of the correlation response are small, only minor threshold value corrections are carried out from one correlation process to the next.

One exemplary embodiment of the invention is characterized in that the correlations in the first selection step are evaluated on the basis of hard-decided (that is to say dual) signal values. This considerably reduces the computation complexity, although a relatively high degree of inaccuracy must be expected owing to the minimal resolution of the signal values (as is desired of the 2-stage selection method used according to the invention).

The second selection step may include any desired further processing of the possible synchronization times determined in the first selection step. According to one embodiment variant of the invention, the second synchronization step likewise includes a correlation step. This means that the signal obtained at the possible synchronization times determined in the first synchronization step are once again correlated with the known sequence (sync word) with higher accuracy. According to one method variant, the correlations in the second selection step are evaluated on the basis of soft-decided signal values (that is to say a correlation result for a specific hypothetical synchronization time has a high resolution of, for example, 16 bits and is also stored with this resolution for subsequent evaluation). This results in the increased accuracy required in the second selection step.

The method according to the invention for slot synchronization of mobile stations is preferably used in the UMTS Standard. According to the UMTS Specification 3GPP TS 25.211 V4.4.0 (2002-03), a sequence comprising 256 chips is transmitted at each slot start in a first synchronization channel pSCH (Primary Synchronization Channel). This sequence is used to determine the slot start in the method according to the invention.

According to another embodiment of the invention, an apparatus for synchronization of a receiver to a transmitter has a means for repeated correlation of the signal received in the receiver with the known sequence, with correlation values of a correlation response in each case being produced. The apparatus further comprises a means for comparison of the correlation response with a threshold value, a means for adaptive variation of the threshold value as a function of at least one measured parameter, and a first selection means for determination of possible synchronization times by selection of those times at which the adaptive threshold value has been exceeded a predetermined number of times.

In addition, the apparatus includes a memory for storage of the possible synchronization times, and a second synchronization means which uses the set of possible synchronization times to determine the actual synchronization time of one or more cells. The means for adaptive variation of the threshold value varies the threshold value as a function of the at least one measured parameter in such a way that the total number of possible synchronization times corresponds to a predetermined number. The adaptive variation of the threshold value between successive correlations means that the number of possible synchronization times selected by the first selection means is matched to the capacity of the second selection step.

One alternative embodiment of the invention is characterized by a means for evaluation of the correlation response and for production of the at least one parameter, with the parameter being characteristic of the statistical properties of the correlation response. Evaluation of the statistical properties of the correlation responses allows good threshold value matching to be achieved for the stated purposes.

The means for evaluation of the correlation response and for production of the at least one parameter as well as the means for adaptive variation of the threshold value are, in one example, hard-wired hardware circuits. This means that the successive threshold value matching during successive correlations can be carried out independently of a processor, that is to say it does not demand any computation power from a processor.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in the following text using one exemplary embodiment and with reference to the drawing in which.

DETAILED DESCRIPTION OF THE INVENTION

Figure 2:
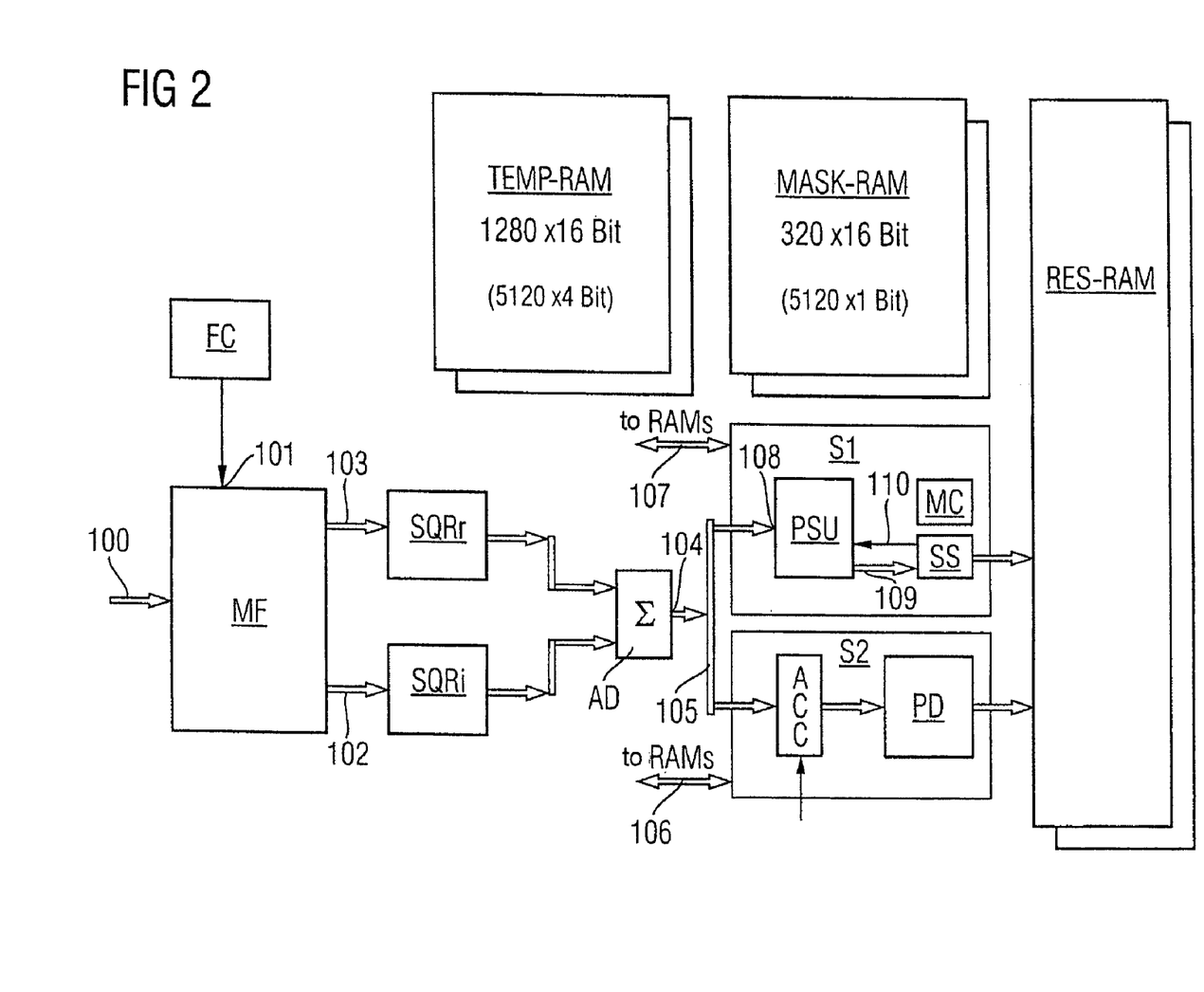
FIG. 2 is a block diagram illustrating a circuit architecture for synchronizing a receiver to a transmitter, according to one exemplary embodiment of the present invention.

According to FIG. 2, a circuit according to the invention for slot synchronization has a matched filter MF, to which complex sample values of a synchronization signal which is transmitted via the first synchronization channel pSCH are supplied via an input 100. Assuming oversampling by a factor of 2, this represents 5120 sample values for the in-phase component and 5120 sample values for the quadrature component for each slot. Via an input 101, the match filter MF receives filter coefficients which are produced from a read only memory FC (filter coefficients). The filter coefficients are dependent on the sync word (synchronization sequence) which is transmitted via the synchronization channel pSCH. The filter coefficients are chosen such that the impulse response of the matched filter MF corresponds to the complex-conjugate sync word reflected in time.

The matched filter MF produces a result for the real part and for the imaginary part of each sample value. The imaginary part of the filtered signal is emitted via a data link 102, and the real part of the filtered signal is emitted via a data link 103.

These filtered signals are then squared in the squarers SQRi and SQRr, respectively. The squared signal components are then added sample value by sample value with the correct timings in an adder AD. A signal which is referred to in the following text as the correlation response is emitted for one slot period at one output 104 of the adder AD. The correlation response comprises 5120 correlation values for each slot. This is determined coherently, that is to say taking account of the amplitude and phase of the synchronization signal.

The correlation response is passed via a data link 105 to a first selection unit S1 and to a second selection unit S2. The outputs of the two selection units S1, S2 are connected to a result memory RES-RAM, which is a volatile memory and can store 128 values. Furthermore, the two selection units S1 and S2 are connected via respective data links 107 and 106 to two further volatile memories TEMP-RAM and MASK-RAM. The memory TEMP-RAM in the exemplary embodiment explained here has a memory size of 1280×16 bits, and the memory size of the memory MASK-RAM is, by way of example, 320×16 bits. As indicated by the shadow lines in FIG. 2, all of the volatile memories RES-RAM, TEMP-RAM and MASK-RAM may be duplicated.

The first selection unit S1 comprises a preselection unit PSU, a statistics unit SS (Slot Statistics) and a calculation unit MC for determination of variables which are stored in the memory MASK-RAM. The second selection unit S2 comprises an accumulator ACC and a peak detector PD.

The circuit illustrated in FIG. 2 operates as follows:

The preselection unit PSU is supplied with the correlation responses successively via the data link 105 at an input 108. Ncor denotes the number of correlation responses which should be evaluated for an initial selection process. The index n indexes the correlation responses, that is to say n=1, 2, ..., Ncor.

During evaluation of a correlation response n in the unit PSU, each correlation value of this correlation response is compared with a threshold value T(n). The index k indexes the correlation values of a correlation response, and corresponds to the number of sample values for one slot, that is to say in the example explained here, k=1, 2, . . . , 5120.

The threshold value T(1) for the first correlation response (n=1) is signaled to the unit PSU via a digital signal processor DSP which is not illustrated. The initial threshold value is calculated in the DSP as a function of RSSI (field strength) measurements and of the AGC setting, as well as on the basis of noise measurements, and is signaled to the unit PSU before the evaluation of the first correlation response n=1.

The preselection unit PSU compares each correlation value (relating to the index k) of the first correlation response (n=1) with the threshold value T(1). A count $z_1(k)=1$ is set for those correlation values which are above the threshold value T(1).

The accumulated counts $z_n(k)$ of all the previous correlation responses including the current correlation response n relating to all the sample values (k) for a slot are each administered in the form of 4-bit words in the memory TEMP-RAM. The memory TEMP-RAM is therefore partitioned in the form 5120×4 bits (in general: the number of correlation values×the count word length). During the evaluation of the n=1 subsequent correlation responses where n=2, 3, . . . , Ncor these counts are incremented on a sample-value related basis whenever the k-th correlation values of these correlation responses are in each case greater than the associated threshold values T(n). This will be described in more detail in the following text.

The correlation responses n=1, 2, . . . , Ncor are also passed via the data link 109 to the statistics unit SS. The task of the statistics unit SS is to evaluate statistical properties of the current correlation response n, and then to emit a control signal (via the control line 110), which is passed to the unit PSU and, if appropriate, indicates a change in the threshold value T(n+1). The changed threshold value T(n+1) is then used for evaluation of the next correlation response n+1 in the unit PSU. Once again, the individual correlation values (5120 of them) are then successively compared with the new threshold value T(n+1). The count $z_{n+1}(k)$ which is administered in the memory TEMP-RAM is incremented for each sample index k, provided that the threshold value T(n+1) is not exceeded.

After the processing of the Ncor correlation responses, the memory TEMP-RAM thus contains the number of times that the threshold value has been exceeded $Z_{Ncor}(k)$ for each time index k. After Ncor correlations, $Z_{NCor}(k)$ can thus assume the value Ncor as a maximum.

The memory contents of TEMP-RAM are then evaluated. Which of the counts $Z_{Ncor}(k)$ (index k) and how many of them have exceeded a target count (ztar) are then determined. The target count ztar is calculated by the DSP in advance on the basis of signal strength and noise measurements. It is of course, also dependent on Ncor.

If the adaptive threshold value matching process, which will be described in more detail in the following text, was successful, then the number of times the threshold value was exceeded with respect to the target count ztar is, quite accurately, 1280. In general terms, this corresponds highly accurately to the predetermined size of the subset of possible synchronization times intended for further data processing.

The memory TEMP-RAM is evaluated by the calculation unit MC. The calculation unit MC checks for each sample index k whether the associated count $Z_{Ncor}(k)$ satisfies the condition $Z_{Ncor}(k)>ztar$. A flag is set to the value 1 in the memory MASK-RAM for each sample index k for which this condition is satisfied. The memory MASK-RAM is thus used as a 1-bit memory for 5120 entries (in general: the number of correlation values×1).

This therefore identifies the subset (sought in the first selection step) of possible candidates for the synchronization time of one or more cells. We will return later to the further data processing based on this subset as determined in the first selection step.

Figure 3:
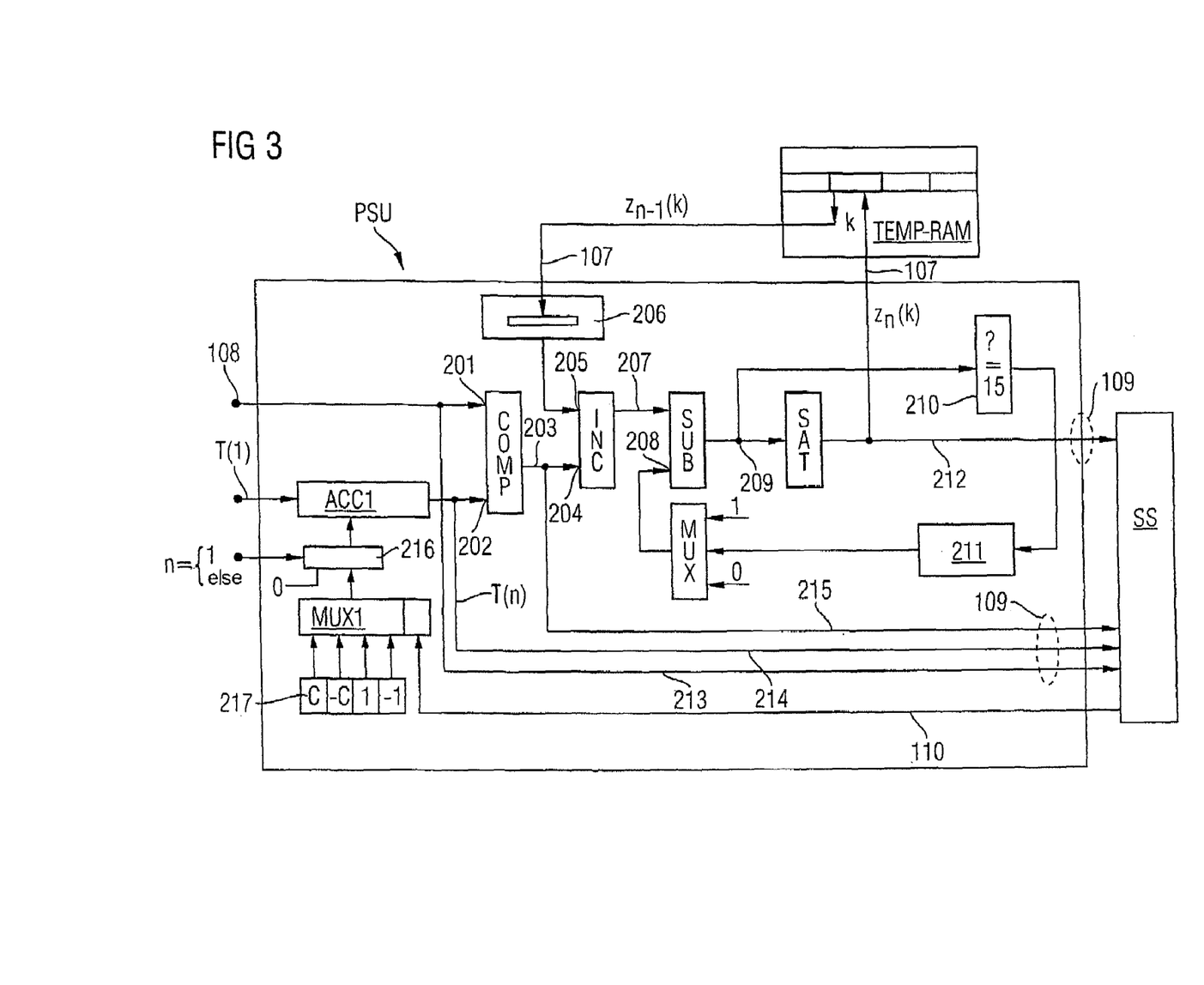
FIG. 3 is a circuit diagram illustrating a unit configured to perform initial selection of possible synchronization times from FIG. 2.

FIG. 3 shows a circuit example of the design of the unit PSU. The unit 108 is connected to a first input 201 of a comparator COMP. The current threshold value T(n) is applied to the second input 202 of the comparator COMP.

If the correlation value entered via the input 108 is greater than T(n), the comparator COMP emits an activation signal 203. The activation signal 203 is passed to a control input 204 of an incrementer INC. A buffer store 206 is connected to the incrementing input 205 of the incrementer INC. The buffer store 206 contains a count $z_{n-1}(k)$ which has previously been read from the memory TEMP-RAM. When an activation signal 203 is present, the count $z_{n-1}(k)$ is incremented by the incrementer INC. Initially, it is assumed that the incremented count $z_n(k)$ is less than or equal to 15, that is to say there are no problems in storing it as a 4-bit word in the memory TEMP-RAM. In this situation, the value 0 is applied via a multiplexer MUX to the subtraction input 208 of a subtractor SUB. The incremented count $z_n(k)$ is received by the subtractor SUB via a data link 207 and is passed on without being changed via a data link 209 to a saturation stage SAT which is designed for the value range (0, . . . , 15). Furthermore, the incremented count $z_n(k)$ is passed to a comparator 210, which checks whether $z_n(k)$ assumes the value 15.

The incremented count $z_n(k)$ emitted from the saturation stage SAT is written to the memory TEMP-RAM via the data link 107. The comparator 210 as well as a control stage 211 connected downstream from the comparator prevent the memory TEMP-RAM from overflowing in the situation where the count $z_n(k)$ has reached its maximum value 15. If the result of the comparison process carried out in the comparator 210 for at least one incremented count for a correlation response n is positive, the control stage 211 switches the multiplexer MUX to the value 1 at the start of the evaluation of the next correlation response n+1. This results in all of the counts $z_{n+1}(k)$ which have been supplied to the substractor SUB being decremented by the value 1 irrespective of whether or not they have been incremented in the unit INC. This ensures that the value emitted at the output of the substractor SUB is never greater than 15. The saturation stage SAT in this case prevents negative counts from being produced.

In this case, the threshold value T(n) is matched for successive correlations n=1, 2, . . . , Ncor as follows:

The counts $z_n(k)$ are passed via the data link 212 to the statistics unit SS throughout the entire evaluation of the correlation response n. Furthermore, the statistics unit SS receives further information via the data links 213 (correlation values), 214 (current threshold value T(n)) and 215 (activation signal and threshold value decision). Once the correlation response n has been processed in the unit PSU, the statistics unit SS signals via the control line 110 to the unit PSU the amount by which the previous threshold value T(n) should be changed for the evaluation of the next correlation response n+1 (new threshold value: T(n+1)).

One simple option for threshold value adaptation is explained in FIG. 3 with reference to the units ACC1, a multiplexer 216, a further multiplexer MUX1 and a 4-value memory 217. The multiplexer 216 chooses the value 0 for n=1, so that the accumulator ACC1 emits to the comparator COMP the initial threshold value T(1) supplied from the DSP. The multiplexer 216 is connected to the output of the multiplexer MUX1 for processing all the other correlation responses. The multiplexer MUX1 has four inputs which receive the values c, −c, 1, −1. c is a positive integer greater than 1, which, for example, was calculated in advance by simulations. The control signal 110 emitted from the statistics unit SS now selects one of the four following options:

$$T(n+1)=T(n)+1$$

$$T(n+1)=T(n)-1$$

$$T(n+1)=T(n)+c$$

$$T(n+1)=T(n)-c$$

Figure 4:
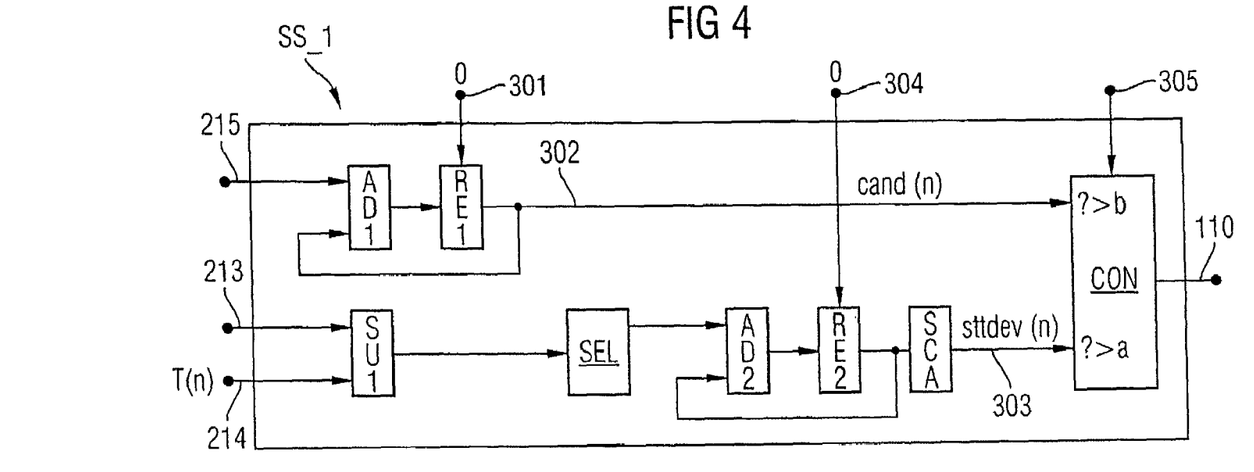
FIG. 4 is a circuit diagram illustrating a control unit for adaptive threshold value adjustment according to one embodiment of the invention.

FIG. 4 shows a first section SS_1 of the statistics unit SS. The circuit section SS_1 controls the adaptive threshold value adjustment.

An adder AD1 and a register RE1 are connected in the form of an accumulator. The register RE1 has a reset input 301, by means of which it is reset to the value 0 before the start of evaluation of a correlation response. The threshold value decisions are passed to the adder AD1 via the input 215. At the end of processing of a correlation response, a value cand(n) is produced at the output 302 of the register RE1, which indicates how many positive threshold value decisions have been made in the unit PSU during the processing of the n-th correlation response:

$$cand(n)=d(k)$$

In this case, d(k)=1 indicates a positive threshold value decision, and d(k)=0 a negative threshold value decision.

A further distribution measure ("standard deviation") for the correlation values of the n-th correlation response is calculated by means of a substractor SU1, a selection stage SEL, an accumulator which comprises a register RE2 and an adder AD2 and an optional scaling stage SCA. The subtractor SU1 forms the difference between this correlation value and the threshold value T(n) for each correlation value relating to the sample k. The selection stage SEL ensures that the differences are passed on only when they are positive, that is to say when the correlation value is greater than the threshold value. These positive differences are added up in the accumulator AD2, RE2 over the sample index k=1, . . . , 5120. After any scaling which may also need to be carried out by the unit SCA (the scaling is ignored in the present example), the further statistical measure sttdev(n) for the distribution width ("standard deviation") of the correlation values of the correlation response n is produced.

$$sttdev(n)=(\text{correlation value}(k)-T(n)),$$

considering only positive expressions (correlation value (k)−T(n)).

The register RE2 is reset via a reset line 304.

The unit SCA is connected to a control circuit CON via a data line 303. The control circuit CON uses the information cand(n) and sttdev(n) to decide how the threshold value T(n+1) should be changed for the next correlation response n+1. The algorithm that is provided for this purpose is specified in the following text. In this case, a and b are fixed parameter values which have been calculated in advance by simulation.

1st case: $sttdev(n) > a$ and $cand(n) > b$: $T(n+1) = T(n) + c$

2nd case: $sttdev(n) < a$ and $cand(n) < b$: $T(n+1) = T(n) - 1$

3rd case: $sttdev(n) > a$ and $cand(n) < b$: $T(n+1) = T(n) - c$

4th case: $sttdev(n) < a$ and $cand(n) > b$: $T(n+1) = T(n) + 1$

The new threshold value T(n+1) is emitted on the basis of the above case decision. The control line 305 presets the required parameters. The unit PSU illustrated in FIG. 3 is then controlled in the already described manner via the control line 110.

It is evident that the correlation response is evaluated in the statistics unit SS on the basis of two characteristic variables, specifically a characteristic variable (sttdev(n)) for assessment of the "sharpness" of correlation peaks, and a variable (cand(n)) for assessment of the "yield". This makes it possible to decide whether a high yield is due to one or more correlation peaks having been found, or is due to interference influences.

The performance of the method according to the invention is also governed by suitable choice of the parameters a, b and c. In particular, the desired number of preselected possible synchronization times (in this case 1280) can be adjusted by the choice of the parameter b.

Figure 5:
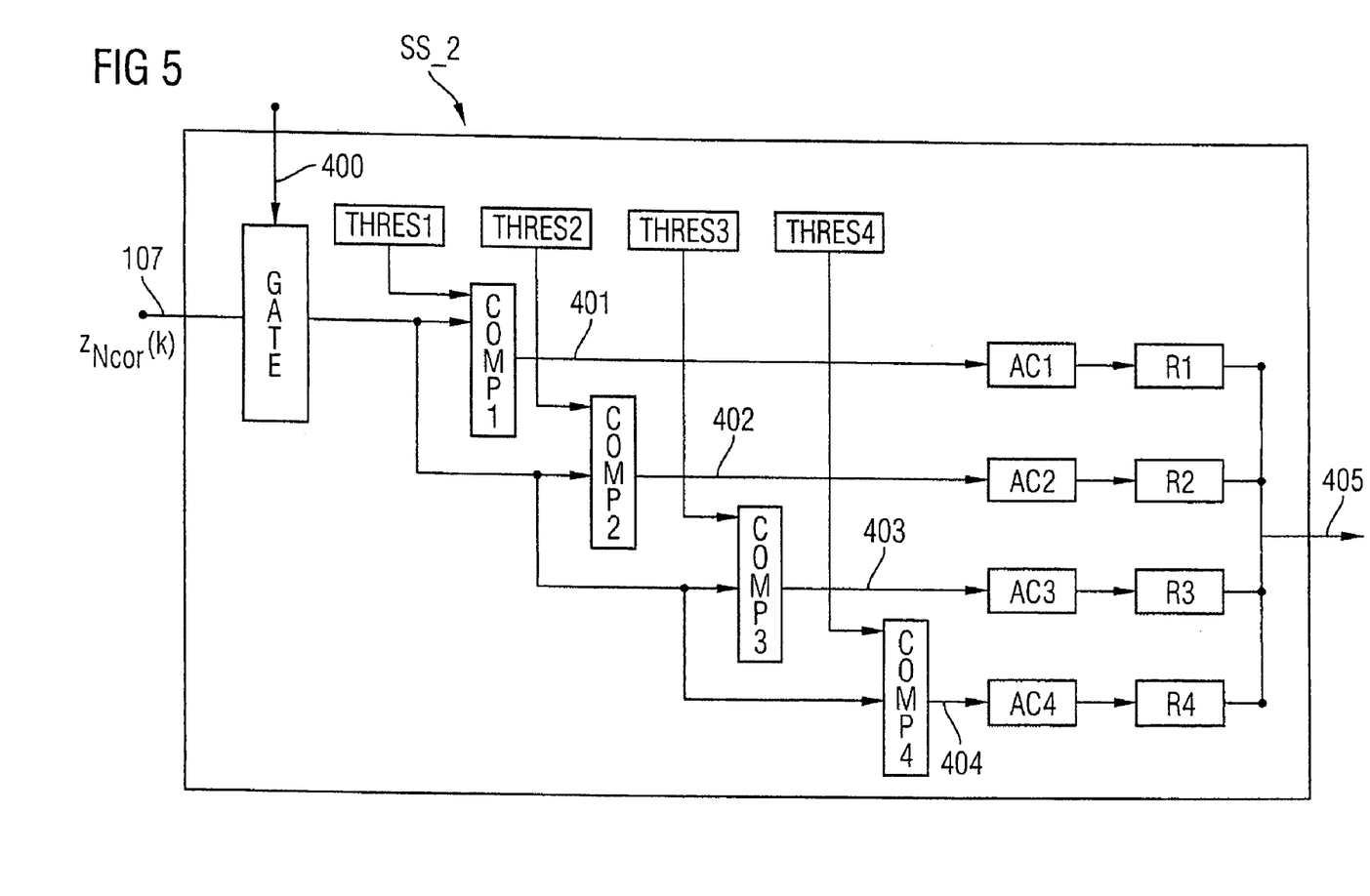
FIG. 5 is a circuit diagram illustrating a unit for determination of the statistics obtained in the first selection step according to another embodiment of the present invention.

The circuit section SS_2 illustrated in FIG. 5 can be integrated in the statistics unit SS in order to check the initial selection step. After the evaluation of all of the correlation responses, the circuit section SS_2 is supplied via the data link 107 with all of the final counts $Z_{Ncor}(k)$, k=1, . . . , 5120, from the memory TEMP-RAM. The circuit section SS_2 is activated via the control line 400 which is connected to a switch GATE.

The circuit section SS_2 has four comparators COMP1, COMP2, COMP3, COMP4, four count memories THRES1, THRES2, THRES3, THRES4, four accumulators AC1, AC2, AC3, AC4 and four registers R1, R2, R3, R4. The circuit section SS_2 allocates the counts $Z_{Ncor}(k)$ determined over Ncor correlation responses to different classes. For example, the values stored in the count memories THRES1, THRES2, THRES3, THRES4 may be the numbers 1, 2, 3, 4. The comparators COMP1, COMP2, COMP3 and COMP4 always emit a value 1 at their outputs 401, 402, 403, 404 whenever the value $z_{Ncor}(k)$ is equal to or greater than the value stored in the respective count memory THRES1, THRES2, THRES3, THRES4. The comparator outputs 401, 402, 403, 404 are accumulated in the respective accumulators AC1, AC2, AC3, AC4, and are stored in the registers R1, R2, R3, R4.

In consequence, the register R1 contains the number of counts which are equal to or greater than the value stored in the first count memory THRES1, the register R2 contains the number of counts which are equal to or greater than the value stored in the count memory THRES2, etc. It is now assumed that the target count ztar (for example ztar=3), which has already been defined by the DSP, is stored in the count memory THRES3. In this case, the register R3 contains the number of counts $z_{Ncor}(k)$ greater than 3. This number is in the region of 1280, provided that the threshold value matching has operated. The values stored in the registers R1, R2, R3 and R4 can be read out and checked by the DSP (not shown) via an output 405. If the threshold value matching fails, it may be necessary to change the parameter a, b or c. Between 2 and 60 correlation responses are typically processed in the described manner for the first selection step.

The 1280 possible synchronization times found in the first selection step are then further restricted in the second selection step. In the exemplary embodiment described here, only a further selection of possible synchronization times to produce a total of 128 remaining candidates is envisaged initially. A first option is to carry out the second selection step without carrying out any further correlation processes, solely on the basis of the data in the memory MASK-RAM. This is possible only when the quality of the first selection step (despite the poor capability to differentiate between its results) is sufficiently good that the best 128 synchronization times can be selected on the basis of the result class allocation process described above, and be stored in the memory RES-RAM.

In most cases, the second selection step includes another correlation process, which is more accurate and is carried out exclusively on the basis of the possible synchronization times found in the initial selection step. This means that only correlation values at the times stored in the memory MASK-RAM are calculated and processed further here.

At least part of the second selection step is carried out in the unit S2, which accesses the memory MASK-RAM via the data link 106 and accumulates correlation values in the accumulator ACC at the preselected times. By way of example, the correlation values are likewise calculated in the unit MF. The correlation values are in this case determined with high accuracy (16 bits) and are temporarily stored in the memory TEMP-RAM for further selection. In contrast to the first selection step, no yes/no decision is made here, with the full resolution of the accumulated correlation values being utilized in this case. The peak detector PD then selects from the accumulated correlation values those 128 accumulated correlation values with the maximum peak height. These are stored in the memory RES-RAM. In the course of further processing steps (frame synchronization, code identification), the possible times are further restricted to the sought synchronization time, or it is possible to provide for the sought synchronization time to be determined (as the accumulated correlation value with the maximum peak height) in the unit S2 itself, solely with the aid of the peak detector PD.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for synchronization of a receiver to a transmitter which periodically transmits a sequence which is known in the receiver, comprising:
   (a) determining a set of possible synchronization times in a first selection process by repeated correlation of a signal received by the receiver with the known sequence, resulting in a plurality of correlation responses, and comparing the correlation responses with a threshold value; and
   (b) determining the actual synchronization time from the set of possible synchronization times in a second selection process,
   wherein the threshold value is adaptively varied in the first selection process as a function of at least one parameter that is measured during the correlations, and
   wherein the threshold value is varied such that the total number of possible synchronization times in the determined set corresponds to a predetermined number.

2. The method of claim 1, wherein determining the set of possible synchronization times in the first selection process comprises:
   (a1) comparing correlation values of a correlation response with the threshold value;
   (a2) identifying the instances at which the correlation values of the correlation response exceed the threshold value;
   (a3) measuring the at least one parameter;
   (a4) varying the threshold value as a function of the parameter;
   (a5) repeating acts (a1) to (a4) for further correlation responses; and
   (a6) determining the set of possible synchronization times as those times at which the adaptively varied threshold value has been exceeded a predetermined number of times.

3. The method of claim 1, wherein the at least one measured parameter is characteristic of statistical properties of the correlation response.

4. The method of claim 3, wherein a first parameter of the at least one measured parameter comprises a measure of the distribution width of a plurality of correlation values associated with a respective correlation response.

5. The method of claim 4, wherein a second parameter of the at least one measured parameter indicates the number of times at which the correlation values of the correlation response exceed a current threshold value.

6. The method of claim 4, wherein varying the threshold value comprises:
   increasing the threshold value by a first threshold value offset when the number of times at which correlation values of the correlation response exceed the threshold value is greater than a first predetermined number; and
   reducing the threshold value by a second threshold value offset when the number of times at which the correlation values of the correlation response exceed the threshold value is less than a second predetermined number.

7. The method of claim 6, wherein the first threshold value offset, or the second threshold value offset, or both, increase as a distribution width of the correlation values of the correlation response rises.

8. The method of claim 1, wherein a correlation filter is employed to carry out the correlations in the first selection process.

9. The method of claim 1, wherein the correlations are evaluated on the basis of hard-decided signal values in the first selection process.

10. The method of claim 1, wherein the second selection process includes a correlation process in determining the actual synchronization time.

11. The method of claim 10, wherein a correlation filter is employed to carry out the correlations in the second selection process.

12. The method of claim 10, wherein the correlations are evaluated on the basis of soft-decided signal values in the second selection process.

13. The method of claim 1, wherein the set of possible synchronization times that are determined in the first selection process are subdivided into classes that are distinguished by the number of times the threshold values are exceeded.

14. The method of claim 1, further comprising using the determined actual synchronization time for time slot synchronization of mobile stations in the UMTS standard.

15. An apparatus for synchronization of a receiver to a transmitter which periodically transmits a sequence that is known in the receiver, comprising:
- a means for repeated correlation of the signal received in the receiver with the known sequence, with correlation values of a correlation response in each case being produced therefrom;
- a means for comparison of the correlation values of the correlation response with a threshold value;
- a means for adaptive variation of the threshold value as a function of at least one measured parameter;
- a first selection means for determination of possible synchronization times by selection of those times at which the adaptive threshold value has been exceeded; and
- a second selection means which uses the set of possible synchronization times to determine the actual synchronization time, wherein the first selection means selects those times at which the adaptive threshold value was exceeded a predetermined number of times during repeated correlation, wherein the apparatus for synchronization comprises a memory for storage of the possible synchronization times, and wherein the means for adaptive variation of the threshold value varies the threshold value as a function of the at least one measured parameter such that the total number of possible synchronization times corresponds to a predetermined number.

16. The apparatus of claim 15, further comprising a means for evaluation of the correlation responses and for production of the at least one parameter, wherein the at least one parameter is characteristic of the statistical properties of the correlation response.

17. The apparatus of claim 16, wherein the means for evaluation of the correlation responses and for production of the at least one parameter comprises a hard-wired hardware circuit.

18. The apparatus of claim 15, wherein a first parameter of the at least one parameter comprises a measure of the distribution width of the correlation values of the correlation response.

19. The apparatus of claim 18, wherein a second parameter of the at least one parameter indicates the number of times at which the correlation values of the correlation response exceed a current threshold value.

20. The apparatus of claim 15, wherein the means for adaptive variation of the threshold value comprises a hard-wired hardware circuit.

21. The apparatus of claim 15, wherein the means for repeated correlation comprises a correlation filter.

22. The apparatus of claim 15, wherein the second selection means comprises a correlation filter.

23. The method of claim 1, wherein the threshold value is an adaptive threshold value and, for each correlation response, the number of correlation timings at which the correlation response exceeds the adaptive threshold value is counted, and wherein the adaptive threshold value is varied in the first selection process as a function of at least one parameter that is measured during the correlations and as a function of the counter number of correlation timings.

* * * * *